US005296161A

United States Patent [19]

Wiersema et al.

[11] Patent Number: 5,296,161

[45] **Date of Patent: * Mar. 22, 1994**

[54] ENZYMATIC PERHYDROLYSIS SYSTEM AND METHOD OF USE FOR BLEACHING

[75] Inventors: Richard J. Wiersema, Tracy; Anna G. Stanislowski, Walnut Creek, both of Calif.

[73] Assignee: The Clorox Company, Oakland, Calif.

[ * ] Notice: The portion of the term of this patent subsequent to Jul. 9, 2008 has been disclaimed.

[21] Appl. No.: 964,565

[22] Filed: Oct. 21, 1992

Related U.S. Application Data

[63] Continuation of Ser. No. 768,466, Sep. 30, 1991, abandoned, which is a continuation of Ser. No. 363,442, Jun. 6, 1989, abandoned, which is a continuation of Ser. No. 872,252, Jun. 9, 1986, abandoned.

[51] Int. Cl.$^5$ .................................................. C09K 3/00

[52] U.S. Cl. .......................... 252/186.38; 252/186.41; 252/186.42; 252/186.43; 252/95; 252/174.12; 8/111

[58] Field of Search ...................... 252/186.38, 186.41, 252/186.42, 186.43, 94, 95, 99, 174.12

[56] References Cited

U.S. PATENT DOCUMENTS

| | | | |
|---|---|---|---|
| 3,553,139 | 1/1971 | McCarty | 252/95 |
| 3,558,498 | 1/1971 | Eymery et al. | 252/174.12 |
| 3,637,339 | 1/1972 | Gray | 8/111 |
| 3,676,352 | 7/1972 | Grimm et al. | 252/174.12 |
| 3,960,743 | 6/1976 | Nakagawa | 252/99 |
| 3,974,082 | 8/1976 | Weyn | 252/95 |
| 4,283,301 | 11/1981 | Diehl | 252/102 |
| 4,338,210 | 7/1982 | Clements et al. | 252/174.12 |
| 4,381,247 | 4/1983 | Nakagawa et al. | 252/95 |
| 4,412,934 | 11/1983 | Chung | 252/186.38 |
| 4,421,664 | 12/1988 | Anderson et al. | 252/94 |
| 4,421,668 | 12/1988 | Cox et al. | 252/174.12 |
| 4,462,922 | 7/1984 | Boskamp | 252/174.12 |
| 4,511,490 | 4/1985 | Stanislowski | 252/174.12 |
| 5,030,240 | 7/1991 | Wiersema et al. | 8/111 |
| 5,069,809 | 12/1991 | Lagerwaard et al. | 252/174.12 |
| 5,108,457 | 4/1992 | Poulose et al. | 8/111 |

FOREIGN PATENT DOCUMENTS

| | | | |
|---|---|---|---|
| 166571 | of 0000 | European Pat. Off. | |
| 0185522 | of 0000 | European Pat. Off. | |
| 130064 | 1/1985 | European Pat. Off. | 11/3/386 |
| 0253487 | 1/1988 | European Pat. Off. | C11D3 39 |
| 2420647 | 4/1974 | Fed. Rep. of Germany | |
| 2003378 | 11/1969 | France | C1107/00 |
| 864798 | of 0000 | United Kingdom | |
| 1401312 | of 0000 | United Kingdom | |

OTHER PUBLICATIONS

"Lipases", Chapter IV, pp. 25-175 in Lypolytic Enzymes by H. Brockerhoff and R. G. Jensen, 1974, Academic Press, New York.

(List continued on next page.)

*Primary Examiner*—Richard D. Lovering
*Assistant Examiner*—Joseph D. Anthony
*Attorney, Agent, or Firm*—Joel J. Hayashida; Michael J. Mazza; Harry A. Pacini

[57] ABSTRACT

A perhydrolysis system or activated oxidant system for in situ generation of peracid in aqueous solutions is disclosed including an esterase or lipase enzyme, a source of hydrogen peroxide, and a functionalized ester substrate having the structure

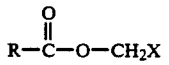

wherein R is a substituent having at least one carbon atom and X is a functional moiety or group. Preferred substrates include glycerides, ethylene glycol derivatives and propylene glycol derivatives. The system is adapted for use in both high and low temperature wash conditions. In one embodiment, a lipase enzyme is employed with an insoluble substrate and an emulsifying agent. In another embodiment, an esterase and/or lipase enzyme, a glyceride substrate and hydrogen peroxide produce a peracid with active oxygen from a peracid of at least about 0.5 ppm. Bleaching processes and stain removal capabilities are also disclosed.

12 Claims, No Drawings

OTHER PUBLICATIONS

J. M. Brown, "Micellar Catalysis", Conference proceedings (1980), Published by Harwood, Chichester, England.
J. R. Darwent, "Oxidation in Micelles", a thesis submitted at Exeter College (1978).
T. Tatara, "Evaluation of Lipases for Laundry", *J.A.O.C.S.*, pp. 1053–1058 (1985).
Sheldon N. Lewis, "Peracid and Peroxide Oxidations", *Oxidation*, vol. 1, 213–254, Marcel Dekker, Inc., N.Y., New York (1969).
Robert G. Jensen, "Lipolytic Enzymes" in *Progress the Chem. Fats Other Lipids*, (1971), 11, pp. 347–394.
Hans Andree, "Lipases as Detergent Components", J. Applied Biochem., vol. 2, 218–229 (1980).
Alan F. Hofmann, "Hydrolysis of Long-Chain Monoglyderides in Micellar Solution by Pancreatic Lipase", Biochimica Et.
Biophysica Acta, vol. 70, pp. 317–331 (1963).
Alan F. Hofmann, "The Behavior and Solubility of Monoglycerides in Dilute, Micellar Bile-Salt Solution", Biochimica EP Biophysica Acta, vol. 70, pp. 306–316 (1963).
European Search Report Feb. 29, 1988.

ENZYMATIC PERHYDROLYSIS SYSTEM AND METHOD OF USE FOR BLEACHING

This is a continuation of copending application Ser. No. 07/768,466 filed on Sep. 30, 1991, now abandoned, which is a continuation of copending application Ser. No. 07/363,442 filed on Jun. 6, 1989, now abandoned, which is a continuation of co-pending application Ser. No. 06/872,252 filed on Jun. 9, 1986, now abandoned.

FIELD OF THE INVENTION

The present invention relates to a novel enzymatic perhydrolysis or activated oxidant system and method of use for the systems in aqueous solution for achieving enhanced bleaching, the activated oxidant system and bleaching method being particularly characterized by the ability to produce available oxygen of a peracid origin in the aqueous solution.

BACKGROUND OF THE INVENTION

Various bleaches have long been employed in numerous cleaning applications, including the washing and prewashing of fabrics as well as in other applications, such as hard surface cleaning. In these applications, the bleaching agent oxidizes various stains or soils on fabrics, textiles and hard surfaces.

Peroxygen bleaching compounds such as hydrogen peroxide, sodium percarbonate and sodium perborate have been found useful in dry bleach formulations because of their oxidizing power.

It has also been found that addition of certain organic compounds, including activators such as tetracetyl ethylene diamine, to perborate bleaches can improve bleaching performance because of in situ formation of peracids.

Cleaning compositions for fabrics, textiles and other materials including hard surfaces have also been developed which employ various enzymes for removing certain stains or soils. For example, protease enzymes have been found useful for hydrolyzing protein-based stains particularly in the cleaning of fabrics. Amylase enzymes have been found useful against carbohydrate-based stains resulting for example from foods. Lipase enzymes have also been found useful for hydrolyzing fat-based stains in a prewash or presoak mode.

In connection with the use of enzymes in cleaning or detergent compositions, European Patent Application, Publication, No. 0 130 064, applied for by Novo Industri A/S, related to improvements in enzymatic additives for use with detergents in washing applications. That publication discussed the use of lipase enzymes for achieving substantially improved lipolytic cleaning efficiency, over a broad range of wash temperatures including relatively low temperatures below 60° C. This reference further disclosed the use of enzymes, including lipases, for direct interaction with stains or soils as a means of at least partially dissolving or loosening such fat-based stains.

U.S. Pat. No. 3,974,082, issued Aug. 10, 1976 to Weyn, disclosed a bleaching composition and method of use in which an alkyl ester was combined with an esterase or lipase enzyme in an aqueous medium and which was contended to liberate an acyl moiety from the ester. The Weyn patent further contended that the use of this combination together with a percompound would lead to in situ formation of peracid.

Accordingly, there has been found to remain a need for improved bleaching or activated oxidant systems capable of enhanced performance in aqueous solution at low temperature wash conditions while still maintaining high temperature performance.

SUMMARY OF THE INVENTION

The present invention provides a successful activated oxidant system for achieving enzymatic perhydrolysis of a substrate in the presence of a source of hydrogen peroxide to produce a peracid.

In the above combination, the enzyme acts to catalytically enhance the reaction of substrates resulting in the in-situ formation of peracid.

It is accordingly a further object of the invention to provide an activated oxidant system for in situ generation of peracid in an aqueous solution or bleaching process. The activated oxidant system comprises:

(a) an enzyme having lipase and/or esterase activity;

(b) a substrate being a functionalized ester having the structure

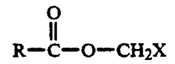

wherein R is a substituent having at least one carbon atom, more preferably where R is a straight chain or branched chain alkyl optionally substituted with one or more functional groups or heteroatoms such as a phenol group, a halo group or atom, etc. and X is a functional moiety, the substrate being capable of hydrolysis by the enzyme of (a); and (c) a source of hydrogen peroxide which will combine with the substrate of (b) activated by the enzyme of (a) to produce the peracid.

It is a further object of the invention to provide such an activated oxidant system where the substrate is substantially incapable of chemical perhydrolysis.

Accordingly, the enzymatic perhydrolysis or activated oxidant system of the invention provides a number of advantages including the employment of an inexpensive substrate together with a small amount of an enzyme for producing the resulting peracid. At the same time, the system of the invention has been found to be effective in both high and low temperature wash solutions as employed for example in Europe and the United States respectively. In particular, the enzymatic perhydrolysis or activated oxidant system of the invention has been found to be very effective for producing active oxygen in low temperature wash solution.

It is a further object of the invention to provide such an activated oxidant system including the structure shown above wherein X preferably comprises a functionalized polyol or polyether. It is also a further object of the invention to provide the activated oxidant system as shown above wherein X includes at least one carbon atom and at least one functional group. Preferably, the substrate of the system is selected from the group consisting of:

(i) glycerides having the structure

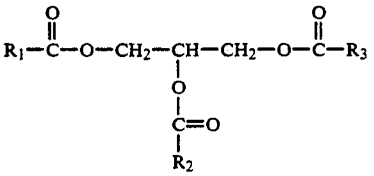

wherein $R_1=C_1-C_{12}$, $R_2=C_1-C_{12}$ or H and $R_3=C_1-C_{12}$ or H;

(ii) an ethylene glycol derivative having the structure

wherein n=1-10 and $R_1$ is defined as above; and (iii) a propylene glycol derivative having the structure

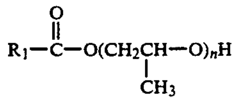

wherein $R_1$ and n are defined as above.

It is yet a further object of the invention to provide an activated oxidant system and bleaching method employing such a system wherein the substrate is normally insoluble in aqueous solution if the chosen enzyme has lipase activity and the system further comprises an emulsifying agent or agents selected for forming interfaces as interaction sites for the lipase enzyme and normally insoluble substrate.

It is also a further object of the invention to provide an activated oxidant system for use in aqueous cleaning solutions and a corresponding bleaching process where the system includes an esterase enzyme, a substrate and a source of hydrogen peroxide. The identities and quantities of the esterase enzyme and substrate are more preferably selected for interacting with each other in the presence of hydrogen peroxide to produce a peracid having the formula RCOOOH with active oxygen of at least about 0.1 parts per million (ppm) in aqueous solution for providing enhanced stain removing ability. More preferably, the enzyme and substrate are selected for achieving about 0.5 to about 50 ppm active oxygen from peracid and even more preferably about 1 to about 20 ppm active oxygen from peracid.

Preferred substrates are disclosed for use in low temperature wash applications below about 60° C. and in high temperature wash applications of from about 60° C. to about 100° C.

Additional objects and advantages of the invention are made apparent in the following description and examples of the invention which, however, are not to be taken as limiting the scope of the invention, but rather to merely facilitate an understanding thereof.

DESCRIPTION OF THE PREFERRED EMBODIMENTS

As noted above, the present invention relates to a novel peracid generating reaction in the form of an enzymatic perhydrolysis system and corresponding process of bleaching, in aqueous solution, to provide relatively high bleaching activity in both high and low temperature wash applications.

The novel enzymatic perhydrolysis system essentially comprises an esterase or lipase enzyme as defined below, a substrate, and a source of hydrogen peroxide. Accordingly, the invention is based upon peracid or perhydrolysis chemistry which, by itself, has been dealt with at length in the prior art, for example, in an article by Sheldon N. Lewis, entitled "Peracid and Peroxide Oxidations" in the publication *Oxidation*, Volume 1, published by Morrel Dekker, Inc., New York, N.Y., 1969, (see pages 213-254). Even though such a detailed discussion of basic peracid and perhydrolysis chemistry is not believed necessary for an understanding of the invention by those skilled in the art, that reference is incorporated herein as though set out in its entirety to assist in understanding of the invention.

In addition to the essential components of the enzymatic perhydrolysis system including an esterase or lipase enzyme, a substrate and a hydrogen peroxide source, the perhydrolysis system of the invention also preferably includes one or more emulsifying agents selected for maintaining the substrate in suspension and for promoting interaction of the substrate and enzyme in the presence of hydrogen peroxide from the hydrogen peroxide source. Use of one or more emulsifying agents of this type is particularly contemplated where the enzyme is a lipase enzyme so that the emulsifying agent can assist in forming a liquid phase interface at which the lipase enzyme can better interact with the glyceride substrate.

In addition, the perhydrolysis system may also preferably include various buffering agents, stabilizers and other adjuncts described in greater detail below.

Typical peracid precursors are known which convert to peracid non-enzymatically in the absence of enzymatic catalysis. Typical peracid precursors require specific chemical modification (Published Specification GB 864,798 published Apr. 6, 1961; U.S. Pat. No. 4,412,934 issued Nov. 1, 1983 to Chung et al; U.S. Pat. No. 4,283,301 issued Aug. 11, 1981 to Diehl; and Published Application EP 166571 published Jan. 2, 1986) to be of sufficient reactivity to provide the requisite performance attributes.

In order to ensure proper understanding and interpretation of the invention, including the summary and preferred embodiments as well as the claims, a number of definitions are set forth below to clarify the use of terms employed herein. The defined terms include the following:

"Perhydrolysis" is defined as the reaction of a substance with hydrogen peroxide. As discussed elsewhere, the hydrogen peroxide may be supplied from a variety of sources. Of particular interest to the present invention are those perhydrolysis reactions in which a selected substrate reacts with inorganic peroxide to yield a peracid product.

In the preferred perhydrolysis reactions yielding a peracid product, both the inorganic peroxide starting material and the peracid product are oxidants. Traditionally, inorganic peroxide has been used as the oxidant, for example, in dry laundry bleaches. However, the oxidative power of the inorganic peroxide and peracid product are very different, and it is important to note that the peracid product is the desired oxidant for laundry bleaches according to the present invention. In addition to the oxidative ability of the peracid product making it an effective stain removal agent for laundry bleaches, the peracid oxidant remains sufficiently mild to assure only minimal reaction with dyes and other adjuncts used in laundry bleach products.

Therefore, it is very important to distinguish these two oxidants from each other and to correctly identify the source of measured active oxygen. The source of measured active oxygen in the present invention is determined by a modification of the thiosulfate assay technique which is well known to those skilled in the art.

"Chemical perhydrolysis" generally includes those perhydrolysis reactions in which an activator or peracid precursor such as tetracetyl ethylene diamine is combined with a source of hydrogen peroxide. Accordingly, sufficient reactivity between the peracid precursor or activator and inorganic peroxide must be present to produce the perhydrolysis reaction.

"Significant chemical perhydrolysis" is defined for purposes of the present invention as a minimum amount of reactivity between a selected activator and inorganic peroxide sufficient to generate at least about one part per million (1 ppm) active oxygen (A.O.) at 70+ F. and within 10 minutes. Furthermore, since this definition is involved with chemical perhydrolysis which necessarily excludes enzymatic perhydrolysis, the active oxygen must be generated in the absence of an enzyme.

"Enzymatic perhydrolysis" is defined as a perhydrolysis reaction which is assisted or catalyzed by an enzyme generally classified as a hydrolase and more specifically identified below.

Thus, necessary components for enzymatic perhydrolysis include a substrate, a source of inorganic peroxide and an enzyme. The components may also include an emulsifier selected either to enhance the perhydrolysis reaction or at least to avoid interference with the perhydrolysis reaction. For example, where the substrate is generally insoluble in aqueous solution, the emulsifier may be selected either to solubilize the substrate or to form a two phase interface as discussed below for facilitating enzymatic interaction with the substrate.

Substrates of the type particularly contemplated by the present invention are described in detail elsewhere.

Inorganic peroxide is traditionally provided by perborate or percarbonate salts.

In order to be of assistance in promoting the perhydrolysis reaction as noted above, the minimum calculated specific activity of a selected enzyme would be greater than 6 umoles of substrate/minute·gram of enzyme or 51 umoles of substrate/minute·gram of protein nitrogen.

"Esterase and/or lipase enzymes" define the preferred enzymes for use within the present invention. Although enzymes useful within the invention fall within the general classification of hydrolase enzymes, enzymes having esterase and lipase activity have been found most suitable for assisting in perhydrolysis as described above.

Many different definitions and classifications are possible for such enzymes. For example, it is generally theorized that esterase enzymes tend to interact with substrates in aqueous solution whereas lipase enzymes interact with substrates at a phase interface. According to this traditional definition, lipase enzymes can thus be considered most effective with insoluble substrates where a two phase interface, for example between an aqueous solution and the insoluble substrate, is formed by an emulsifying agent.

However, enzymes are not capable of precise definition or classification. For example, conventionally classified esterase enzymes may tend to exhibit lipase-like activity, whereas conventionally classified lipase enzymes may also tend to exhibit esterase-like activity. Accordingly, within the present invention, the terms "esterase enzymes", "lipase enzymes" and "esterase and/or lipase enzymes" are intended to include both enzymes conventionally classified under those terms as well as other hydrolase enzymes such as proteases exhibiting similar types of activity.

Substrates suitable for use within the present invention are also discussed at length elsewhere herein. However, the preferred substrates of the invention are generally characterized as functionalized esters having the structure

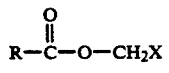

wherein R is a substituent having at least one carbon atom, more preferably where R is a straight chain or branched chain alkyl optionally substituted with one or more functional groups or heteroatoms such as a phenol group, a halo group or atom, etc. and X is a functional moiety. The substrate is further defined as being capable of hydrolysis by an enzyme or enzymes as defined above. Preferably, for purposes of economy and the like, the substrate is even further defined as being ordinarily incapable of substantial chemical perhydrolysis as discussed elsewhere in the specification.

"Functional moiety or group" as employed above and elsewhere in defining the preferred substrates of the invention is used in its generally classical sense to broadly denote a chemical structure other than a simple carbon-carbon single bond. In other instances in the prior art, such functional moieties or groups have further been defined for example as a "functionalized hydrocarbyl radical group".

Generally, a functional group according to the present invention could include chain structures such as polyols or polyethers as well as one or more heteroatoms. In accordance with the preceding definitions, X could thus include leaving groups, solubilizing groups (including sulfonates and carboxylates) as well as halides, nitrogen, sulfur and other such heteroatoms. Furthermore, suitable functional groups for use within the above structure according to the present invention are set forth for example in application Ser. No. 681,983 filed Dec. 14, 1984 by Fong et al for PHENYLENE MONO- AND DIESTER PERACID PRECURSORS, also assigned to The Clorox Company. That reference is accordingly incorporated herein as though set forth in its entirety.

The terms "polyols" and "polyethers" are employed above in defining the functional moiety or group employed within the preferred substrate of the invention. These terms are intended to respectively include diols and diethers as well as longer chain molecules.

Finally, different wash conditions are referred to herein. In this regard, the following terms are specifically defined for purposes of the present invention.

"High temperature wash conditions" refer to wash conditions commonly employed, for example, in Europe. The clothing or fabrics to be cleaned are placed in an aqueous solution along with the cleaning formulation while being subjected to heat during the wash cycle itself. Commonly, the temperature of the wash is raised to the range of 60° C. to 100° C. to assure maximum cleaning effectiveness.

Furthermore, in such high temperature wash conditions, at least about five grams per liter of detergent formulation are employed in the aqueous solution.

"Low temperature wash conditions" commonly refer to conditions such as those employed for example in the United States where the temperature of the aqueous solution is below about 60° C. throughout the entire wash cycle.

Furthermore, in such low temperature wash conditions, commonly no more than about 1.5 grams per liter of detergent formulation are employed in the aqueous solution.

Furthermore, the high and low temperature wash conditions referred to herein are further distinguished by the duration of the wash cycle. For example, the high temperature cycles in the European washes may have a duration of up to about 60 minutes, whereas the low temperature U.S. washes may be no more than about 12 to 15 minutes in duration.

Characteristics and preferred examples of the three essential components of the enzymatic perhydrolysis system, including the glyceride substrate, the enzyme and the peroxide source are first discussed below, followed by a brief discussion of other adjuncts which might be used together with the perhydrolysis system and a number of examples embodying the enzymatic perhydrolysis system of the invention.

GLYCERIDE SUBSTRATE

As noted above, the substrate of the activated oxidant system is selected for enzyme catalyzed reaction, in the presence of a source of hydrogen peroxide, to form peracid.

As will be discussed in greater detail below, certain substrates are normally present as solids and particularly lend themselves to use in dry formulations including the substrate, enzyme and peroxide source. In such products, it is important that the dry formulation exhibit prolonged shelf life with the enzyme catalyzed reaction not taking place until the formulation is added to an aqueous solution.

For use in a laundry detergent formulation, for example, the substrate may also include surfactant characteristics so that in situ formation of the peracid occurs at or near the surface of the fabric to be cleaned. This assures greater effectiveness of the oxidant responsible for bleaching action.

It has been found, in accordance with the present invention, that various fatty acid or glyceride type materials are particularly suitable for forming the substrate of the present enzymatic perhydrolysis system.

Preferably, the substrate of the present invention is a functionalized ester having the structure

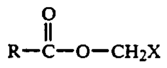

wherein R is a substituent having at least one carbon atom, more preferably where R is a straight chain or branched chain alkyl optionally substituted with one or more functional groups or heteroatoms such as a phenol group, a halo group or atom, etc. and X is a functional moiety. The substrate is capable of enzymatic hydrolysis as defined above and preferably is ordinarily incapable of substantial chemical perhydrolysis. More preferably, the functional moiety comprises a functionalized polyol or polyether. More broadly, the functional moiety includes at least one carbon atom and at least one functional group.

Even more preferably, the substrate of the invention is selected from the group consisting essentially of:

(i) glycerides having the structure

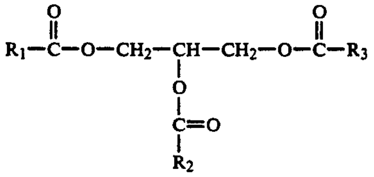

wherein $R_1=C_1-C_{12}$, $R_2=C_1-C_{12}$ or H and $R_3=C_1-C_{12}$ or H;

(ii) an ethylene glycol derivative or ethoxylated ester having the structure

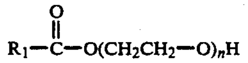

wherein $n=1-10$ and $R_1$ is defined as above; and (iii) a propylene glycol derivative or propoxylated ester having the structure

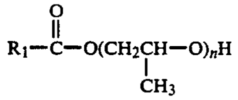

wherein $R_1$ and n are defined as above.

Within the preferred structures referred to immediately above, $R_1$ is more preferably $C_6-C_{10}$ and most preferably $C_8-C_{10}$, $R_2$ is more preferably $C_6-C_{10}$ or H and most preferably $C_8-C_{10}$ or H and $R_3$ is more preferably $C_6-C_{10}$ or H and most preferably $C_8-C_{10}$ or H.

The use of glycerides, especially diglycerides and triglycerides, is particularly preferred within the enzymatic perhydrolysis system of the present invention since each triglyceride molecule is capable of stoichiometrically yielding up to three fatty acid or peracid molecules. Thus, the use of such a glyceride may be particularly effective in achieving maximum oxidizing power in the presence of a peroxide source and enzyme as discussed in greater detail below.

Broadly, the glyceride substrate is characterized by glyceride chains including from about one to about eighteen carbon atoms. Lower molecular weight glycerides derived from such products as acetic acid naturally occur as liquids. Thus, additional processing steps may be necessary in order to include such a substrate in a dry formulation such as a laundry detergent. However, the lower molecular weight glyceride products may also tend to be more effective in higher temperature cleaning applications.

High molecular weight glyceride substrates such as stearic acid characterized by a chain of seventeen carbon atoms normally appear as solids and thus may facilitate their inclusion in a dry detergent formulation, for example. However, such high molecular weight glyceride chains may not produce maximum oxidizing power in accordance with the present invention.

The most preferred form of substrate for use within the enzymatic perhydrolysis system of the invention has been found to be either trioctanoin or tridecanoin characterized respectively by glyceride chains of eight and ten carbon atoms.

These two triglycerides also tend to be present as solids and thus lend themselves to inclusion in a dry formulation as discussed above. At the same time, trioctanoin and tridecanoin tend to exhibit surfactant characteristics within aqueous solution lending themselves to in situ formation of peracid as discussed above.

Finally, the two preferred triglyceride molecules discussed above have also been found to be particularly desirable for use in combination with preferred lipase enzymes. As will be discussed in greater detail below, lipases are characterized by their interaction with substrate at liquid phase interfaces. Within an aqueous wash solution, trioctanoin and tridecanoin products are generally water insoluble and thus lend themselves readily to suspension within micelles formed within the aqueous solution. At the same time, the chain lengths of these two glycerides have also been found to be particularly desirable for interaction with the peroxide in the in situ formation of peracids as discussed above.

All of the substrates discussed above including triglycerides such as the most preferred trioctanoin and tridecanoin are very inexpensive and are thus also important for reducing initial cost of the enzymatic perhydrolysis system of the present invention. As will also be discussed below, the substrate and hydrogen peroxide source are the two major components of the enzymatic perhydrolysis system in that the enzyme need only be present in very small amounts, less than stoichiometric, to carry out the in situ peracid production contemplated in the aqueous solution. The enzyme thus acts in a catalytic manner in that, while it participates in the reaction, it is not consumed but regenerates itself for further reaction.

PEROXIDE SOURCE

As for the oxidant source of the enzymatic perhydrolysis system of the invention, virtually any source of peroxide is satisfactory. For example, the peroxide source may comprise a perborate or percarbonate such as sodium perborate or sodium percarbonate. In addition, the peroxide source may comprise or include hydrogen peroxide adducts such as urea hydrogen peroxide, etc.

Accordingly, further discussion of the particular oxidant source is not believed necessary except to the extent that the source is selected to produce hydroxy peroxide also in accordance with the preceding discussion.

ENZYME

Since the substrate of the enzymatic perhydrolysis system is characterized by an ester structure, most suitable enzymes for use in the enzymatic perhydrolysis system preferably include esterase and/or lipase enzymes from the broader group of hydrolase enzymes. As discussed in greater detail below, lipase enzymes are most preferred for use in the perhydrolysis system because of their predominant tendency to interact with substrate molecules at a hydrophilic-hydrophobic phase interface. In the enzymatic perhydrolysis system of the present invention, this phase interface is formed by the substrate and emulsifier in aqueous solution.

General characteristics of enzymes of the types noted above are well known in the prior art and are readily available from a number of commercial sources. For example, lipolytic enzymes or lipases have long been known to be widely distributed in many tissues, fluids, cells, seeds, organs etc. and to perform an important metabolic function in producing free fatty acids and partial glycerides. These enzymatic products transport fatty acids through membranes and release acids for oxidation and resynthesis into triglycerides, for example.

Lipase enzymes are also of particular interest because of their classical interaction with triglycerides in order to hydrolyze the triglycerides and release the individual carboxylic acids from the triglyceride molecules. A similar interaction occurs in connection with other glycerides including diglycerides, for example.

The particular sequence in which the enzymes attack the triglyceride depends upon the specificity of the enzyme. Different enzymes may have different sequences of attack upon the triglyceride and may release one to three acid molecules. For purposes of the present invention, it is preferable that an enzyme be used which will hydrolyze all or most of the acyl groups from the substrate molecules in order to permit maximum peracid production. For example, with the substrate preferably being a triglyceride, it is preferred that an enzyme be included in the enzymatic perhydrolysis system which is capable of removing all three acyl chains. However, enzymes which only remove some of the glyceride chains may be satisfactory.

As mentioned above, a primary distinction between esterase and lipase enzymes lies in the site where the enzyme initiates hydrolysis. As noted above, lipase enzymes are particularly characterized in that hydrolysis occurs predominantly at two phase interfaces with the enzyme being in an aqueous or hydrophilic phase. If the substrate is a relatively long chain glyceride, the substrate is quite hydrophobic. Thus, the lipase enzymes are particularly suited for interacting with the glyceride molecules at the phase interface with the lipase enzyme being in the hydrophilic phase and the glyceride substrate being in the hydrophobic phase. Esterase enzymes, on the other hand, are characterized by predominant hydrolysis in the homogeneous aqueous phase. In other words, an esterase enzyme classically does not work at an interface.

In reality, different enzymes may, at times, tend to exhibit characteristics of the other. For example, although a lipase enzyme classically interacts with a substrate at an interface and tends to thus require two separate phases as discussed above, it is possible for lipase enzymes to exhibit esterase activty and to interact with a substrate in a homogeneous aqueous solution. However, activity of a lipase enzyme in such a homogeneous aqueous solution is lower than classical hydrolysis at an interface.

Other factors may also contribute to preventing the formation of a clear dividing line between lipase and esterase enzymes.

At the same time, substrates contemplated by the present invention may tend to be hydrophobic and thus commonly appear within a hydrophobic phase of an aqueous solution. However, certain glyceride substrates, particularly triglycerides or diglycerides of lower molecular weight may tend to be water soluble, thus being suitable for interaction either with esterase or lipase enzymes in accordance with the preceding discussion.

In any event, either lipase or esterase enzymes are suitable for use within the enzymatic perhydrolysis system of the present invention. However, lipase enzymes from a variety of sources are most preferred for use in the present invention, especially lipase enzymes of the Pseudomonas species. Specific examples of lipase enzymes, including the enzyme source and commercial designation are included within the examples and comprise a most preferred set of enzymes for use within the invention.

As for enzymes considered suitable for use in the present invention, their most important characteristic is the ability to produce perhydrolysis in an aqueous solution. Other characteristics of the enzyme are also important in connection with the present invention, including enzyme activity as an indication of effectiveness within the perhydrolysis reaction.

In the following examples, enzyme activity is indicated by the amount of perhydrolysis noted for each example. In addition, enzyme specificity is of significance and relates to the number and order of fatty acid chains released from the glyceride substrate. Enzyme stability is also important with respect to temperature, peroxides, peracids and other possibly harmful agents or factors which may be present in cleanser formulations employing the enzyme perhydrolysis system. The enzyme mechanism is also significant in that it refers to the manner in which the enzyme functions within the perhydrolysis system and the degree of effectiveness the enzyme exhibits in the perhydrolysis reaction.

THE ENZYMATIC PERHYDROLYSIS REACTION

In understanding the present invention, it is important to distinguish the classical interaction of a lipase enzyme with a glyceride substrate from the enzymatic perhydrolysis system of the present invention where the enzyme and glyceride interact with each other in the presence of a source of hydrogen peroxide. This interaction is discussed above and also dealt with at length in the prior art, including the references noted above.

In the following discussion, the reaction of the present invention is discussed particularly with reference to a lipase enzyme and a triglyceride substrate. However, other substrates may be used within the invention as well as a wide variety of lipase enzymes and esterase enzymes as also discussed above. In particular, reference is commonly made below to a triglyceride substrate identified as trioctanoin. This name is commonly employed since each molecule includes three glyceride chains, each having eight carbon atoms. However, this molecule may also be identified under the nomenclature tricaprylin or glycerol trioctanoate.

The interaction of a lipase enzyme with a substrate such as a triglyceride, for example, trioctanoin, is well documented but is described briefly below in order to assure a complete understanding of the invention.

Generally, an enzyme such as a lipase is a large protein in a long polymeric form having a molecular weight from about 15,000 to about 150,000. The enzyme polymer is formed of amino acids with radical groups as side chains. The polymeric chain of an enzyme folds together so that, when the amino acids with the R group side chains are in close proximity to each other, they form an "active site" where the reaction of interest actually occurs. The folded configuration of the enzyme is important and, if disturbed, may prevent the enzyme from performing its normal reaction function. This limitation is particularly of interest in certain situations, such as enzymatic systems employed in high temperature wash applications. The enzymes tend to become "denatured" when a certain temperature is exceeded so that, above that temperature, the enzyme is not capable of performing its normal function.

It has surprisingly been found that lipolytic enzymes added to a substrate combined with hydrogen peroxide produce peracid. This is surprising because (1) the enzymes will produce peracid in a hostile, oxidizing environment (both peroxide and peracid) and (2) peroxide can participate in the hydrolase-catalyzed reaction of a substrate to generate peracid.

The reaction of the enzymatic perhydrolysis system of the invention exhibits a number of important practical advantages in generating peracid for bleach applications. These advantages include the following:

(1) The preferred glyceride substrate also includes the ability to stoichiometrically yield a greater number of individual fatty acid chains and accordingly peracid molecules (than a simple ester) upon completion of the reaction.

(2) Furthermore, the preferred substrates include glycerides which are widely available and relatively inexpensive compared to "activators" as discussed above.

(3) The enzyme, preferably a lipase enzyme and/or esterase enzyme, may be expensive but is used in very small amounts because it functions in enzymatic or catalytic fashion and need not be present in stoichiometric quantities.

Various other advantages are also present within the enzymatic perhydrolysis system of the invention. For example, the reaction described above can take place at a variety of pH levels as demonstrated further in the following examples. Thus, the enzymatic perhydrolysis system is useful in normally basic aqueous solutions and also in relatively neutral solutions and even in acidic solutions. In this regard, there has been found to be real utility for peracid precursor systems capable of functioning at a variety of pH levels inherent in different cleaning applications, even for hard surfaces and particularly for different laundry applications.

As a further example, some newer detergents operate at lower pH levels than previously. Thus, with the enzymatic perhydrolysis system of the present invention, the use of a buffer is possible but not necessary and any pH is possible between a relatively basic pH of 10.5 to the lower pH levels established by a detergent such as Liquid Tide (a trademark of the Proctor & Gamble Co.).

As also noted above, the enzymatic perhydrolysis system of the present invention is also adapted for use at a wide variety of temperatures, as long as they do not exceed the denaturing temperature for the enzyme. Accordingly, the enzymatic perhydrolysis system may be employed in low temperature wash conditions as well as high temperature wash conditions.

In any event, the enzymatic perhydrolysis system of the present invention has particularly been found useful in low temperature wash cycles where it has traditionally been more difficult to achieve effective bleaching.

EMULSIFIER

The use of emulsifiers or surfactants is generally desirable as in other peracid bleach products. As noted above, when a lipase enzyme is employed, it preferably interacts with the substrate at a phase interface of the aqueous solution. Accordingly, the use of emulsifiers is believed to be of particular value in establishing and maintaining a phase interface promoting interaction between the enzyme and glyceride substrate. Esterase enzymes tend to interact with the substrate entirely within an aqeuous phase in a generally homogeneous reaction. Accordingly, emulsifiers or surfactants can similarly be of value in establishing and maintaining the enzyme and substrate within the aqueous phase.

It is believed that nonionic surfactants are particularly suitable for use within the enzyme perhydrolysis system of the invention. Nonionic surfactants include linear ethoxylated alcohols, such as those sold by Shell Chemical Company under the brand name NEODOL. Other nonionic surfactants include various linear ethoxylated alcohols with an average length of from about 6 to 16 carbon atoms and averaging about 2 to 20 moles of ethylene oxide per mole of alcohol; linear and branched, primary and secondary ethoxylated, propoxylated alcohols with an average length of about 6 to 16 carbon atoms and averaging 0 to 10 moles of ethylene oxide and about 1 to 10 moles of propylene oxide per mole of alcohol; linear and branched alkylphenoxy (polyethoxy) alcohols, otherwise known as ethoxylated alkylphenols with an average chain length of 8 to 16 carbon atoms and averaging 1.5 to 30 moles of ethylene oxide per mole of alcohol; and mixtures thereof.

Additional nonionic surfactants include certain block copolymers of propylene oxide and ethylene oxide, block polymers propylene oxide and ethylene oxide with propoxylated ethylene diamine, and semi-polar nonionic surfactants such as amine oxides, phosphine oxides, sulfoxides, and their ethoxylated derivatives.

Anionic surfactants may also be employed. Examples of such anionic surfactants include ammonium, substituted ammonium (for example, mono-, di-, and triethanolammonium), alkali metal and alkaline earth metal salts of $C_6$–$C_{18}$ fatty acids and resin acids, linear and branched alkyl benzene sulfonates, alkyl sulfates, alkyl ether sulfates, alkane sulfonates, olefin sulfonates, hydroxyalkane sulfonates, acyl sarcosinates and acyl N-methyltaurides.

Suitable cationic surfactants include the quarternary ammonium compounds in which typically one of the groups linked to the nitrogen atom is a $C_8$–$C_{18}$ alkyl group and the other three groups are short chained alkyl groups which may bear inert substituents such as phenol groups.

Further, suitable amphoteric and zwitterionic surfactants, which may contain an anionic water-solubilizing group, a cationic group and a hydrophobic organic group, include amino carboxylic acids and their salts, amino dicarboxylic acids and their salts, alkylbetaines, alkyl aminopropylbetains, sulfobetaines, alkyl imidazolinium derivatives, certain quarternary ammonium compounds, certain quarternary phonium compounds and certain tertiary sulfonium compounds. Other examples of potentially suitable zwitterionic surfactants can be found in Jones, U.S. Pat. No. 4,005,029, at columns 11-15, which are incorporated herein by reference.

Other exemplary emulsifiers include water soluble or dispersible polymers, such as polyvinyl alcohol (PVA), polyvinylpyrrolidone (PVP), methylhydroxypropylcellulose (MMPC), etc. as well as bile and other natural emulsifiers.

OTHER ADJUNCTS

Additional adjuncts of a wide variety may be considered for use in combination with the enzymatic perhydrolysis system of the present invention, depending upon the specific application contemplated. For example, as noted above, the enzymatic perhydrolysis system may be employed or included within a wide variety or cleanser applications or formulations such as straight bleach products, prewash products (which are often in liquid form) and even various hard surface cleansers.

For liquid formulations, it may be convenient to keep the hydrogen peroxide source separate from either the substrate or the enzyme, and preferably, from both. This could be accomplished by using a multiple chambered dispenser, such as that disclosed in U.S. Pat. No. 4,585,150, issued Apr. 29, 1986, to Beacham et al, and commonly assigned to The Clorox Company.

Suitable adjuncts may include fragrances, dyes, builders, stabilizers, buffers, etc. Stabilizers may be included to achieve a number of purposes. For example, the stabilizers may be directed toward establishing and maintaining effectiveness of the enzymes for original formulation components or even intermediate products existing after the formulation is placed in an aqueous solution. Since enzymes may be hindered in hydrolysis of the substrates because of heavy metals, organic compounds, etc., for example, suitable stabilizers which are generally known in the prior art may be employed to counter such effects and achieve maximum effectiveness of the enzymes within the formulations.

Buffering agents can also be utilized in the invention to maintain a desired alkaline pH level for the aqueous solutions. Buffering agents generally include all such materials which are well known to those skilled in the detergent art. In particular, buffering agents contemplated for use in the present invention include but are not limited to carbonates, phosphates, silicates, borates and hydroxides.

EXPERIMENTAL

It is generally believed that the preceding discussion fully sets forth the novel combination of the enzymatic perhydrolysis system of the present invention. However, in order to assure a complete understanding of the invention, a number of specific examples embodying the enzymatic perhydrolysis system of the invention are set forth below.

Examples 1 and 2 set forth below demonstrate the use of lipase enzymes, specifically about one milligram of pancreatic pig lipase per milliliter of reaction mixture (1 Mg/ml) with twelve percent trioctanoin as the glyceride substrate and hydrogen peroxide in a concentration of about 1000 parts per million active oxygen in an aqueous solution. The perhydrolysis reaction of Example 1 was conducted at a pH of 10 while the enzymatic perhydrolysis reaction of Example 2 was conducted at a pH of 11.

Each of Examples 1 and 2 further included polyvinyl alcohol as an emulsifier. The polyvinyl alcohol was a blend of approximately 70 parts 28,000 molecular weight and approximately 30 parts 77,000 molecular weight material. Examples 1 and 2 produced peracid at both pH levels but in greater quantity for the higher pH level of 11. In these two examples, the concentration of peracid, followed by the concentration of hydrogen peroxide in parentheses, both stated as parts per million active oxygen (A.O.), are set forth for time intervals of 0, 15 minutes, 30 minutes and 60 minutes.

EXAMPLE 1

| | Time (Min.): | | | |
|---|---|---|---|---|
| | 0 | 15 | 30 | 60 |
| ppm peracid A.O. | — | 1.7 | 2.6 | 2.8 |
| (ppm $H_2O_2$ A.O.) | (1024) | (944) | (907) | (843) |

EXAMPLE 2

| | Time (Min.): | | | |
|---|---|---|---|---|
| | 0 | 15 | 30 | 60 |
| ppm peracid A.O. | — | 2.4 | 3.8 | 5.2 |
| (ppm $H_2O_2$ A.O.) | (882) | (874) | (866) | (767) |

Example 3, set forth below, demonstrates a similar perhydrolysis reaction with concentrations of various system components as described above for Examples 1 and 2 except that the amount of hydrogen peroxide was varied as set forth within Example 3. Example 3 was also carried out at a pH level of 11.0 and clearly demonstrates that the perhydrolysis effect of the present invention is dependent upon the initial hydrogen peroxide concentration. In other words, as the amount of hydrogen peroxide increases, the amount of peracid produced increases accordingly.

EXAMPLE 3

| $H_2O_2$ (ppm) | Peracid A.O. at 1 hour (ppm) |
|---|---|
| 1314 | 8.4 (± 0.5) |
| 434 | 2.5 (± 0.1) |
| 170 | 1.2 (± 0.2) |
| 1314* (no lipase) | 0.0 |

*Control

Example 4, set forth below, was conducted at a pH level of 7.5 with 12.5% trioctanoin, 1 milligram of *Candida Cylindracea* lipase per milliliter of reaction mixture and hydrogen peroxide at a concentration of 1000 ppm (A.O.) at room temperature with polyvinyl alcohol as an emulsifier similarly as in Examples 1-3. Example 4 demonstrates that peracid is produced even at a low pH level of 7.5. Example 4 is of further significance since non-enzymatic hydrolysis can generally not occur at this low pH level. Accordingly, peracid production demonstrated in Example 4 is necessarily due to enzymatic effects. Example 4 also demonstrates utility of the enzymatic perhydrolysis system of the present invention in low pH applications.

EXAMPLE 4

| $H_2O_2$ (ppm) | Peracid (ppm) at 28 Minutes |
|---|---|
| 0 | 0 |
| 100 | 0.8 |
| 1000 | 7.8 |

Table I set forth below demonstrates perhydrolysis tests conducted with a large number of enzymes identified for each example in Table I. Here again, the perhydrolysis procedures carried out for each example in Table I included 12.5% by weight trioctanoin as a glyceride substrate, polyvinyl alcohol as an emulsifying agent in a concentration similar to that employed in Examples 1-4 and hydrogen peroxide at a concentration of 400 ppm (A.O.) at room temperature, all at a pH of 9.0.

In Table I, different enzyme concentrations are set forth for each example followed by the initial hydrolysis rate and finally the amount of perhydrolysis or peracid production.

TABLE I

| | Enzyme | | | Enzyme Concentration | Initial Hydrolysis | |
|---|---|---|---|---|---|---|
| Example | Commercial Name | Organism | Supplier | (mg/ml) | Rate (meq/min) | Peracid ppm |
| 5 | Lipase K | *Aspergillus niger* | Amano | 1.0 | 0.5 | 1.4 |
| 6 | Lipase Type VII | *Candida cylindracea* | Sigma | 1.0 | 0.2 | 1.3 |
| | | | | 3.0 | 1.7 | 1.9 |
| 7 | CES Lipase | Pseudomonasfl. | Amano | 1.0 | 1.0 | 1.3 |
| 8 | Enzeco Conc. | *Candida cylindracea* | Enz. Dev. | 1.0 | 0.05 | 1.5 |
| | | | | 10.0 | 0.2 | 2.3 |
| 9 | Lipase S | Rhizopus sp. | GB | 1.0 | 1.5 | 0.7 |
| | | | | 0.2 | 0.8 | 1.0 |
| 10 | Lipase P | Pseudomonas sp. | Amano | 1.0 | 0.6 | 1.1 |
| 11 | Enzeco Pan | Mammal | Enz. Dev. | 1.0 | 0.4 | 0.9 |
| 12 | Lipase AIE | *Aspergillus niger* | Amano | 1.0 | 0.03 | 0.9 |
| | | | | 5.0 | 0.14 | NP |
| 13 | Lipase 2212F | Fungal | Rohm Enz. | 1.0 | 0.2 | 0.8 |
| | | | | 3.0 | 1.5 | 2.2 |
| 14 | Lipase JV | *Rhizopus jav* | Amano | 1.0 | 2.2 | 0.8 |
| | | | | 5.0 | 1.9 | 1.2 |
| 15 | Lipase A | Alcaligenes sp | Enz. Dev. | 1.0 | 0.3 | 0.8 |
| 16 | Fermlipase PL | Mammal | Fermco | 1.0 | 0.6 | 0.8 |
| 17 | Pancreatic (pure) | Pig | US Biochem | 1.0 | 0.3 | 0.8 |
| 18 | Pancreatic (crude) | Pig | US Biochem | 1.0 | 0.1 | 0.7 |
| | | | | 5.0 | 1.5 | NP |
| 19 | Lipase 2212C | Pig | Rohm Enz. | 1.0 | 0.5 | 0.7 |
| 20 | Sigma Type XI | *Rhizopus Arrhizus* | Sigma | 0.006 | 5.4 | 1.4 |
| | | | | 0.003 | 2.8 | 1.5 |
| 21 | Lipase SP 285 | Fungal | Novo | 1.0 | 1.5 | NP |
| 22 | Lipase 2212E | Fungal | Rohm Enz. | 1.0 | 0.3 | NP |
| | | | | 5.0 | 1.3 | NP |
| 23 | Lipase CV | Microbial | Fermco | 1.0 | 1.1 | NP |
| 24 | Novozym 225 | *Mucor meithei* | Novo | 1.0 | 0.4 | NP |

TABLE I-continued

| Example | Enzyme: Commercial Name | Enzyme: Organism | Enzyme: Supplier | Enzyme Concentration (mg/ml) | Initial Hydrolysis Rate (meq/min) | Peracid ppm |
|---|---|---|---|---|---|---|
| 25 | Lipase MAP | Muco sp | Amano | 1.0 | 0.3 | NP |
| | | | | 10 | 3.0 | NP |
| 26 | Palatase | *Asperigillus niger* | Novo | 1.0 | NH | NP |
| | | | | 10 | NH | NP |
| | | | | 0.2 | 0.9 | NP |
| 27 | Lipase B | *P. nitroreducens* | Amano | 1.0 | 1.5 | NP |
| 28 | Lipase LP | *Chromobacterium viscosum* | Toyo Jozo | 1.0 | 3.6 | NP |
| | | | | 0.2 | 0.9 | NP |
| 29 | Lipase 300 | Pregastric goat | Miles | 1.0 | NH | NP |
| | | | | 10 | NH | NP |
| 30 | Lipase 400 | Pregastric kid | Miles | 1.0 | NH | NP |
| | | | | 10 | NH | NP |
| 31 | Lipase 600 | Pregastric calf | Miles | 1.0 | NH | NP |
| | | | | 10 | NH | NP |
| 32 | Pan 250 | Pig pancreas | Miles | 1.0 | 0.4 | NP |
| 33 | Lipase TYPE II | Pig pancreas | Sigma | 1.0 | 0.5 | NP |

Table II similarly sets forth additional Examples 34–63 similar to Table 1 above except that they were carried out at a pH of 10.5.

Tables I and II, taken together, demonstrate that, out of a total of 30 lipase enzymes, approximately 20 of those enzymes demonstrated perhydrolysis or production of peracid, under the conditions of the examples in Table I and II. Furthermore, certain of the lipases included in the two tables are capable of producing peracid at both pH levels: 9.0 and 10.5.

Applicants prefer that the enzymes used in the invention have a specific activity greater than about 6 μmoles of substrate/minute·gram of enzyme or 51 μmoles of substrate/minute·gram nitrogen. This activity represents a derived value based on empirical study. In commercially available enzymes, no standard measure of activity is used since the enzymes are proprietary and each manufacturer sets forth its own unit of activity based on the assay selected. However Table III, below, sets forth these diverse values to indicate the adaptability of the invention in using disparate enzymes in the enzymatic perhydrolysis systems.

TABLE II

| Example | Enzyme: Commercial Name | Enzyme: Organism | Enzyme: Supplier | Enzyme Concentration (mg/ml) | Initial Hydrolysis Rate (meq/min) | Peracid ppm |
|---|---|---|---|---|---|---|
| 34 | Lipase K | *Aspergillus niger* | Amano | 1.0 | 0.5 | 3.3 |
| 35 | Lipase P | Pseudomonas sp | Amano | 1.0 | 0.8 | 3.1 |
| 36 | Lipase CES | *Pseudomonas fl.* | Amano | 1.0 | 1.1 | 2.8 |
| 37 | Ferlmipase PL | Mammal | Fermco | 1.0 | 0.3 | 2.1 |
| 38 | Lipase CV | Microbial | Fermco | 1.0 | 1.2 | 1.9 |
| 39 | Lipase S | Microbial | GB | 1.0 | 0.02 | 1.2 |
| 40 | Novozym 225 | *Mucor Meihei* | Novo | 1.0 | 0.3 | 1.1 |
| 41 | Lipase A | Alcaligenes sp | Enz. Dev. | 1.0 | 0.2 | 0.9 |
| 42 | Pan 250 | Pancreatic pig | Miles | 1.0 | 0.2 | 1.4 |
| 43 | Pancreatic (crude) | Pig | US Biochem | 1.0 | 0.05 | 1.6 |
| | | | | 5.0 | 1.3 | 0.6 |
| 44 | Enzeco Pan | Mammal | Enz. Dev. | 1.0 | 0.3 | 1.3 |
| 45 | Lipase 2212C | Pig | Rohm Enz. | 1.0 | 0.5 | 1.0 |
| 46 | Pancreatic (pure) | Pig | US Biochem | 1.0 | 0.3 | 0.8 |
| 47 | Lipase FAP | Rhizopus sp | Amano | 1.0 | 0.9 | 0.7 |
| 48 | Lipase 600 | Calf (pregastric) | Miles | 1.0 | NH | 0.3 |
| | | | | 10 | NH | NP |
| 49 | Lipase 2212F | Fungal | Rohm Enz. | 1.0 | 0.1 | NP |
| | | | | 3.0 | 0.2 | 1.3 |
| 50 | Sigma Type VI-S | Pig | Sigma | 0.03 | 0.3 | 0.9 |
| 51 | Lipase-esterase | Microbial | GB | 1.0 | 0.2 | NP |
| 52 | Lipase SP 285 | Fungal | Novo | 1.0 | 1.8 | NP |
| 53 | Lipase 2212E | Fungal | Rohm Enz. | 1.0 | 0.02 | NP |
| | | | | 5.0 | 0.3 | NP |
| 54 | Lipase MAP | Mucor sp. | Amano | 1.0 | 0.06 | NP |
| | | | | 10 | 0.7 | 0.7 |
| 55 | Palatase | *Aspergillus niger* | Novo | 1.0 | NH | NP |
| | | | | 10 | NH | NP |
| 56 | Lipase AIE | *Aspergillus niger* | Amano | 1.0 | 0.02 | NP |
| | | | | 5.0 | 0.1 | 0.4 |
| 57 | Lipase B | *P. nitroreducens* | Amano | 1.0 | 2.0 | NP |
| 58 | Lipase LP | *Chromobacterium viscosum* | Toyo Jozo | 1.0 | 4.2 | NP |
| | | | | 0.2 | 0.9 | NP |
| 59 | Lipase 300 | Kid pregastric | Miles | 1.0 | NH | NP |
| 60 | Lipase 400 | Kid/lamb | Miles | 1.0 | NH | NP |
| | | | | 10 | NH | NP |
| 61 | Sigma Type XI | *Rhizopus Ahrrizus* | Sigma | 0.003 | 0.8 | 0.9 |
| 62 | Lipase L3126 | Pig | Sigma | 1.0 | 0.3 | 0.7 |
| 63 | Lipase JV | *Rhizopus Javanicus* | Amano | 1.0 | — | NP |

TABLE III

| Enzyme | | | |
|---|---|---|---|
| Commercial Name | Organism | Specific Activity | |
| Lipase K | *Aspergillus niger* | 10,000 | ILU/g[1] |
| Lipase Type VII | *Candida cylindracea* | 3,440 | u/mg[2] |
| Enzeco Conc. | *Candida cylindracea* | 30,000 | u/g[3] |
| Enzeco Pan | Mammal | 26,400 | NFU[4] |
| Lipase 2212F | Fungal | 870 | LU/g[5] |
| Pancreatic (pure) | Pig | 100 | u/mg[6] |
| Pancreatic (crude) | Pig | 20–25 | NFU/mg[7] |
| Lipase 2212C | Pig | 30,000 | FIPU/g[8] |
| Sigma Type XI | *Rhizopus Arrhizus* | 431,000 | u/mg[2] |
| Lipase CV | Microbial | 90,000 | u/g[3] |
| Novozym 225 | *Muco meithei* | 12,000 | LU/g[9] |
| Lipase MAP | Muco sp | 10,000 | ILU/g[1] |
| Lipase 600 | Pregastric calf | 20 | RU/g[10] |
| Pan 250 | Pig pancreas | 250 | LU/g[5] |
| Lipase Type II | Pig pancreas | 35–70 | u/mg[2] |
| Sigma Type VI-S | Pig | 20,000–50,000 | u/mg[2] |
| Lipase MAP | Mucor sp. | 10,000 | ILU/g[1] |

Footnotes
[1]ILU = 1 μmole acid/min. (from Amano Tech. Bulletin #70)
[2]u/mg = u/mg protein
[3]u/g = u/g protein
[4]NFU Per sample label, received 8/11/81
[5]LU/g; LU = 1 μmole butyric acid/minute at 40° C., pH = 6.0, tributyrin, stirring at 1,100 rpm
[6]u/mg; u = 100 μmole acid/60 minutes at 37° C., pH = 7.8, olive oil
[7]NFU/mg; NFU = 1 μmole acid/minute at 37° C., pH = 9.0, olive oil
[8]FIPU/g Per technical bulletin from Rohm Enzyme, 9/76
[9]LU/g; LU = 1 μmole acid/minute, tributyrin at 30° C., pH = 7.0
[10]RU/g; RU = 1.25 μmoles butyric acid/minute "under conditions of assay" from Miles Tech. Bulletin In Table IV set forth below, Examples 64–67 demonstrate perhydrolysis in emulsifier systems carried out at a pH level of 10.5 established by addition of 0.12 moles of phosphate to the solution. Furthermore, in Table IV, each of the Examples included approximately 10% by weight trioctanoin as a glyceride substrate, 1.0 milligram of a respective lipase enzyme per milliliter and hydrogen peroxide at a concentration of 400 ppm (A.O.). Each of the examples of Table IV were carried out with a separate emulsifier identified respectively in Table IV and at various concentrations also set forth in Table IV. For each of the examples and respective emulsifiers, similar perhydrolysis tests including the amount of peracid produced after a time period of 14 minutes was determined for a control without an enzyme and for a number of different enzymes also respectively identified for each of the examples. The various examples of Table IV demonstrate in combination the ability of the enzymatic perhydrolysis system of the present invention to function with a number of different emulsifiers.

TABLE IV

| | Hydrolysis (meq/min) | Peracid (ppm A.O.) (at 14 min.) |
|---|---|---|
| Example 64 | | |
| Triton X-114 5% by wgt) | | |
| -E (control) | — | — |
| Lipase K | 1.2 | 1.9 |
| Pan 250 | — | — |
| CES Lipase | 1.0 | 2.7 |
| P-30 Lipase | 0.8 | 0.5 |
| Example 65 | | |
| Triton X-114 (25%) | | |
| -E (control) | — | 1.3 |
| Lipase K | 0.35 | 3.2 |
| P-30 Lipase | 0.8 | 5.6 |
| Example 66 | | |
| Tween 60 (5%) | | |
| -E (control) | — | 1.8 |
| Lipase K | — | 2.1 |
| Pan 250 | — | — |
| P-30 Lipase | 0.1 | 5.3 |
| Example 67 | | |
| Tween 60 (20%) | | |
| -E (control) | — | — |
| Lipase K | — | 1.9 |
| CES | 0.1 | 4.6 |
| P-30 Lipase | 0.1 | 2.8 |

Table V includes Examples 68–75 demonstrating perhydrolysis results for a preferred lipase enzyme (*Pseudomonas fluorescens*) in combination with trioctanoin as a glyceride substrate and various detergent and emulsifier combinations set forth within Table V.

Further with respect to Table V, the perhydrolysis tests for Examples 68–75 were carried out either with commercial detergent available under the TIDE trade name or a combination of surfactants without the additional components such as builders, fillers, etc. and referred to as a "synthetic detergent". Various emulsifiers were also included in Example 68–75 as indicated in Table V. The emulsifiers included sodium lauryl sulfonate (SLS), sodium deoxycholate, a bile salt which is a natural emulsifier and propylene glycol. The hydrolysis tests carried out for Examples 68–75 in Table V were conducted at a pH level of 10.0 with perhydrolysis being measured after a time interval of 14 minutes.

The results for Examples 68–75 in Table V demonstrated perhydrolysis for a number of these examples.

TABLE V

| Example | Enzyme | Enzyme Level | Detergent | Detergent Level (% w/w) | Emulsifier | Emulsifier Level (% w/w) | Trioctanoin Level (% w/w) | $H_2O_2$ (ppm) | Hydrolysis meq OH min. | Perhydrolysis (ppm) at 14 min. |
|---|---|---|---|---|---|---|---|---|---|---|
| 68 | Lipase CES* | 1.0 | Tide (8.2 P) | 0.15 | — | — | 9.5 | 423 | $2.2 \times 10^{-3}$ | 0.7 |
| 69 | Lipase CES* | 1.0 | Tide (8.2 P) | 0.15 | SLS | 0.01 | 9.5 | 406 | $2.7 \times 10^{-3}$ | 0 |
| 70 | Lipase CES* | 1.0 | Tide (8.2 P) | 0.15 | Na deoxy. | 0.02 | 9.5 | (400) | $2.3 \times 10^{-3}$ | 1.5 |
| 71 | Lipase CES* | 1.0 | Tide (8.2 P) | 0.15 | Na deoxy. | 0.05 | 9.5 | 422 | $2.9 \times 10^{-3}$ | 0.3 |
| 72 | Lipase CES* | 1.0 | Synth. Det.** | 0.028 | — | — | 9.5 | (400) | $2.4 \times 10^{-3}$ | 0 |
| 73 | Lipase CES* | 1.0 | Synth. Det.** | 0.026 | Prop. Glycol | 6.9 | 9.5 | 417 | $2.1 \times 10^{-3}$ | 0 |
| 74 | Lipase CES* | 1.0 | Synth. Det.** | 0.024 | Prop. Glycol | 10.4 | 9.5 | 438 | $2.9 \times 10^{-3}$ | 0 |
| 75 | Lipase CES* | 2.0 | Tide (8.2 P) | 0.15 | — | — | 9.5 | (400) | $3.3 \times 10^{-3}$ | 0 |

*(*Pseudomonas fluorescens*)
**Examples 72–74 included a synthetic detergent formulation of 45.1 wgt. % CALSOFT F-90 (alkylbenzene sulfonate), 40.8 wgt. % SLS (sodoim lauryl sulfonate) and 14.1% NEODOL 25-7 (nonionic surfactant).

Table VI includes Examples 76–78 with perhydrolysis and hydrolysis measured in samples containing hydrogen peroxide at a concentration of 400 ppm (A.O.), a pH level of 10.0 and various concentrations of a preferred Pseudomonas fl. species of lipase enzyme supplied by Amano.

In each of Examples 76–78 in Table VI, perhydrolysis was measured by thiosulfate titration after 14 minutes of reaction. Hydrolysis was measured simultaneously by continuous titration.

The substrates and other components employed in each of Examples 76–78 of Table VI were as follows:

| Component | Amount |
|---|---|
| Trioctanoin/PVA (as in Examples 1–4) | 12.5% by wgt. |
| Liquid hydrogen peroxide (as a source of $H_2O_2$) | 400 ppm A.O. |
| $HPO_4^{-2}$ and | 0.12M |
| pH | 10.0 |

Also in each of Examples 76–78 of Table VI, the enzyme was CES Lipase from Amano Co.

Generally, the results of Table VI indicate that the particular enzyme species employed in Examples 76–78 tends to produce high perhydrolysis results and to accordingly be especially preferred in the enzymatic perhydrolysis system of the present invention.

TABLE VI

| Lipase Concentration (mg/ml) | | Fatty Acid Produced at 14 minutes (meq) | Peracid Produced at 14 minutes (ppm) |
|---|---|---|---|
| Example 76 CES Lipase | 0.1 | 0.14 | 2.4 |
| Example 77 CES Lipase | 0.33 | 2.2 | 3.6 |
| Example 78 CES Lipase | 1.0 | 4.2 | 4.7 |

The preceding examples are all based on the use of a triglyceride substrate with the functional group (i) of the preferred substrates referred to above. Other glycerides included within that same functional group could of course be substituted for the triglyceride in the preceding examples with similar results. At the same time, additional substrates as defined above, particularly those included within the preferred functional groups of ethoxylated esters (ii) and propoxylated esters (iii) could be substituted for the triglyceride substrates in the preceding examples with similar results in terms of production of available oxygen from a peracid source. Similarity of results from the use of such substrates is believed particularly apparent because of the similar functional groups included in those preferred substrate groups and also within the broad substrate group defined above for the present invention.

Further in connection with the preferred functional substrate groups (i), (ii) and (iii) referred to above, specific substrate examples within the first functional group are clearly apparent from the preceding examples.

Examples of substrates from the other two groups are demonstrated by the method of synthesis for a propoxylated ester set forth below in Example 79.

EXAMPLE 79

The procedure for preparation of a propylene glycol monoester of carboxylic acid includes the following steps:

(1) Salt Formation and Dehydration: One equivalent of carboxylic acid and 0.09 equivalents of sodium carbonate were combined in a round bottom flask equipped with a magnetic stir bar and an oil bath for heating. The slurry was heated under vacuum to 150° C. with constant stirring for about one hour to achieve dehydration. The vacuum was released and the reaction cooled to room temperature.

(2) Esterification: The cooled acid/acid salt solution from step (1) was combined with about six equivalents of propylene oxide and heated on a warm oil bath at about 60° C. under reflux for approximately eight hours to complete the esterification reaction. (Completion of the esterification reaction was confirmed by G.C. monitoring.)

(3) The reflux condensate was removed and excess propylene oxide boiled off. About 200 milliliters of diethyl ether per 100 millimoles of acid were added and the resulting solution extracted in a Separatory Funnel with two volumes of 5% sodium carbonate ($Na_2CO_3$). One volume of brine was then added. The ether layer was dried over sodium sulfate, filtered and rotary evaporated to produce the resulting ester product (typically about 90% pure).

Other examples of functionalized substrates according to functional substrate groups (ii) and (iii) can be produced by similar procedures.

Perhydrolysis or activated oxidant systems disclosed by various of the preceding examples can be used in combination with any of a wide variety of detergent formulations typically employed in cleaning fabrics. Specific examples of detergent formulations with which the perhydrolysis systems of the invention can be employed at set forth below in Examples 80 and 81.

EXAMPLE 80

A standard detergent formulation (American Association of Textile Chemists and Colorists Standard Detergent 124) includes the following components:

| Nominal Composition | % by wgt |
|---|---|
| Linear alkylate sulfonate - sodium salt | 14.0 |
| Alcohol ethoxylate | 2.3 |
| Soak - high molecular weight | 2.5 |
| Sodium tripolyphosphate | 48.0 |
| Sodium silicate ($SiO_2/Na_2O$ = 2.0) | 9.7 |
| Sodium sulfate | 16.0 |
| Carboxy Methyl Cellulose (CMC) | 0.25 |
| Moisture and miscellaneous brighteners, etc. | 7.25 |
| TOTAL | 100.00 |

Under conventional low temperature wash conditions (as employed for example in the United States) 1.17 grams of the above detergent is used per liter of wash solution. The wash cycle is carried out in the temperature range of about 20° to 55° C. for a duration of less than about fourteen minutes.

Within such a low temperature wash condition, a dry bleach additive is typically combined at about ½ cup per wash load with the above formulation to provide approximately 30 ppm A.O. of hydrogen peroxide in the wash solution.

In accordance with the present invention, a perhydrolysis or activated oxidant system as disclosed above could be employed with the detergent formulation in place of the dry bleach additive to produce a desired level of activated oxygen from a peracid source.

EXAMPLE 81

By contrast, so called high temperature wash conditions (as conventionally employed for example in various European countries) are carried out in machines including a heating element so that the temperature of the aqueous washing solution is increased during the wash cycle. Under such conditions, heating is applied until the temperature of the wash solution is above about 70° C. and more preferably near the boiling point of water, 100° C. For this reason, the high temperature wash cycle is continued for at least about thirty minutes, possibly up to about sixty minutes.

The high temperature system referred to above employs a relatively higher detergent amount in the wash water of about five grams detergent per liter. At the same time, bleach additives are typically included in such high temperature formulations at a higher level of up to about 200 ppm A.O. of $H_2O_2$.

In this example, the formulation of Example 80 is used at a concentration of 5 grams per liter.

Example 81 is indicative of the use of any of the preceding perhydrolysis or activated oxidant systems in connection with the disclosed high temperature system.

Furthermore, it is noted that of the substrates set forth above, generally the entire range of carbon atoms in the various radical groups of the substrates may be employed. By contrast, in the low temperature wash systems, chain links of at least six carbon groups are preferred with eight to ten carbon atoms being most preferred.

Examples 82–91 set forth in Table VII below demonstrate stain removal for variations of a formulation including a substrate and source of hydrogen peroxide. Each of Examples 82–91 included a standard formulation either with or without different enzymes to demonstrate the effect of addition of the enzyme on stain removal.

In Example 82, the standard formulation included 0.06% by wt trioctanoin 0.0036% by wt PVA (polyvinyl alcohol) and 80 ppm $H_2O_2$. In carrying out the test, five fabric swatches were immersed in 200 ml. of water also containing the above formulation. The test was continued for twelve minutes at room temperature with constant stirring.

Example 83 was run similarly as Example 82 but with the addition of 56 μg/ml of K-30 enzyme.

In Example 84, the formulation and conditions of Example 82 were repeated except that Example 84 was run at 38° C. instead of at room temperature.

Examples 85 and 86 were run similarly as Example 84 but with the addition of 20 μg/ml of K-30 enzyme in Example 85 and the addition of 50 μg/ml of Type VII enzyme in Example 86.

In Example 87, the formulation and conditions of Example 84 were repeated except that the amount of hydrogen peroxide was reduced to 50 ppm.

Examples 88, 89 and 90 were run similarly as Example 87 but with the addition of 20 μg/ml of Lipase S enzyme in Example 88, 20 μg/ml of K-30 enzyme in Example 89 and 20 μg/ml of Type VII enzyme in Example 90.

In Example 91, the formulation and conditions of Example 87 were repeated with the addition of 1.5 g/l of Tide brand detergent.

Example 92 was then run similarly as Example 91 but with the addition of 20 μg/ml of K-30 enzyme.

In Table VII, the identity of the enzyme is indicated for each non-Standard Example followed by a parameter %SR(Y) providing a numerical indication of stain removal on the basis of reflected light and a confidence factor LSD (least significant difference).

Accordingly, Table VII indicates a significant increase in stain removal ability for each of Examples 83, 85, 86, 88–90 and 92 (containing similar enzymes as in Tables I and II) as compared to the respective Control Examples (without enzyme).

TABLE VII

| Example | Enzyme | % SR(Y) | % LSD |
|---|---|---|---|
| 82 (Control) | — | 78.3 | 1.1 |
| 83 | K-30 | 80.7 | 1.1 |
| 84 (Control) | — | 83.0 | 1.3 |
| 85 | K-30 | 84.6 | 1.3 |
| 86 | Type VII | 86.9 | 1.3 |
| 87 (Control) | — | 60.5 | 2.4 |
| 88 | Lipase S | 72.2 | 2.4 |
| 89 | K-30 | 68.5 | 2.4 |
| 90 | Type VII | 67.4 | 2.4 |
| 91 (Control) | — | 67.2 | 1.6 |
| 92 | K-30 | 69.1 | 1.6 |

In another embodiment of the invention, an enzymatic catalytic perhydrolysis system comprises a lipase or esterase enzyme, a source of hydrogen peroxide and a substrate having the configuration $$CH_3(CH_2)_n-\overset{\overset{\displaystyle O}{\|}}{C}-O-(CH_2)_mCH_3$$

where n=0–10 and m=0–10. An especially preferred substrate is provided where n=8–10 and m=0–2.

In this embodiment, it is also preferred that the concentration of enzyme be less than about 5%, more preferably less than about 0.1% and most preferably less than about 0.01% of the reaction mixture. The amount of enzyme appears to be of critical importance as disclosed in greater detail below in Example 93.

EXAMPLE 93

| Ingredient | Concentration |
|---|---|
| Lipase (K30) enzyme[1] | 0.01 mg/ml |
| $H_2O_2$[2] | 400 ppm A.O. |
| Ethyl octanoate[3] | 1.1 wgt. % |
| Polyvinyl alcohol | 0.07 wgt. % |
| Water | Balance |

Footnotes:

[1]Pseudomonas sp, available from Amano.

[2]Liquid $H_2O_2$ was used. In a dry standard bleach formulation, sodium perborate or another inorganic peroxide can supply an equivalent percentage of $H_2O_2$ in aqueous solution.

[3]The ethyl octanoate has the structure $CH_3(CH_2)_6-\overset{\overset{\displaystyle O}{\|}}{C}-O-CH_2CH_2$ and is available from Sigma Chemical Company.

The above composition was combined in a beaker and sonicated. 0.13 ppm A.O. peracid was measured via titration method. When the enzyme was omitted from the above composition, no peracid was produced.

Experiments demonstrated that increased concentrations of enzyme may not yield greater amounts of peracid and, in fact, may yield less. This suggests a critical level of enzyme necessary for use in connection with these types of substrates.

The foregoing description, embodiments and examples of the invention have been set forth for purposes of illustration and not for the purpose of restricting the scope of the invention. Other non-limiting embodiments of the invention are possible in addition to those set forth above in the description and in the examples. Accordingly, the scope of the present invention is defined only by the following claims which are also further illustrative of the present invention.

What is claimed is:

1. An activated oxidant system capable of in situ generation of peracid by enzymatic perhydrolysis, comprising:

(a) a source of peroxygen;

(b) an enzyme having lipase and/or esterase activity; and (c) a functionalized ester substrate having the structure

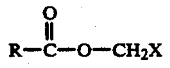

wherein R has at least one carton atom and is a straight chain or branched chain alkyl optionally substituted with one or more functional groups and X comprises a functional group, the functionalized ester substrate being selected from the group consisting of:

(i) glycerides having the structure

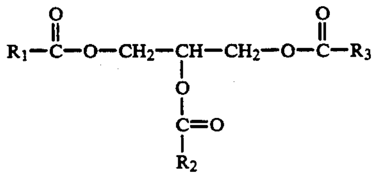

wherein $R_1=C_1$-$C_{12}$, $R_2=C_1$-$C_{12}$ or H and $R_3=C_1$-$C_{12}$ or H;

(ii) ethylene glycol derivatives having the structure

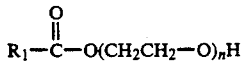

wherein n=1-10 $R_1$ is defined as above; and (iii) propylene glycol derivatives having the structure

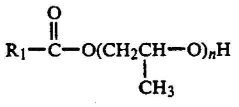

wherein $R_1$ and n are defined as above, the enzyme and ester substrate being selected in combination and employed in selected amounts for interacting with each other in the presence of hydrogen peroxide from the peroxygen source to produce a peracid having the formula RCOOOH wherein $R_1$ of (i), (ii) and (iii) is a substituent having from one to twelve carbon atoms with the newly created peracid compound producing available oxygen of at least about 0.1 ppm in an aqueous solution for providing enhanced stain removing ability, the functionalized ester substrate being incapable of substantial chemical perhydrolysis.

2. The activated oxidant system of claim 1 wherein the enzyme and substrate are selected in combination and employed in selected amounts to yield from about 0.5 to about 50 ppm available oxygen as peracid of enzymatic peracid origin for providing enhanced stain removing ability and improved detergency.

3. The activated oxidant system of claim 1 wherein the enzyme and substrate are selected in combination and employed in selected amounts to yield from about 1.0 to about 20 ppm available oxygen of enzymatic peracid origin for providing enhanced stain removing ability and improved detergency.

4. The activated oxidant system of claim 1 wherein $R_1=C_6$-$C_{10}$, $R_2=C_6$-$C_{10}$ or H and $R_3=C_6$-$C_{10}$ or H.

5. A process for bleaching materials, comprising the steps of contacting the materials with an aqueous solution and combining with the aqueous solution an activated oxidant system for in situ generation of peracid by enzymatic perhydrolysis, comprising:

(a) a source of peroxygen;

(b) an enzyme having lipase and/or esterase activity; and (c) a functionalized ester substrate having the structure

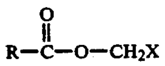

wherein R has at least one carbon atom and is a straight chain or branch chain alkyl optionally substituted with one or more functional groups and X comprises a functional group, the functionalized ester substrate being selected from the group consisting of:

(i) glycerides having the structure

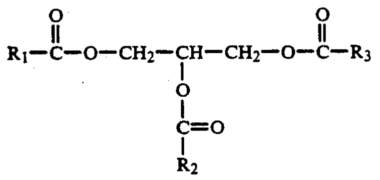

wherein $R_1=C_1$-$C_{12}$, $R_2=C_1$-$C_{12}$ or H and $R_3=C_1$-$C_{12}$ or H;

(ii) ethylene glycol derivatives having the structure

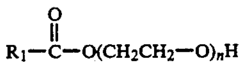

wherein n=1-10 and $R_1$ is defined as above; and (iii) propylene glycol derivatives having the structure

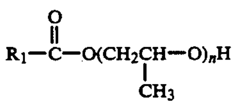

wherein $R_1$ and n are defined as above, the enzyme and ester substrate being selected in combination and employed in selected amounts for interacting with each other in the presence of hydrogen peroxide from the peroxygen source to produce a peracid having the formula RCOOOH wherein $R_1$ of (i), (ii) and (iii) is a substituent having from one to twelve carbon atoms with the newly created peracid compound producing available oxygen of at least about 0.1 ppm in an aqueous solution for providing enhanced stain removing ability, the functionalized ester substrate being incapable of substantial chemical perhydrolysis.

6. The process of claim 5 wherein the enzyme and substrate are selected in combination and employed in selected amounts to yield from about 0.5 to about 50 ppm available oxygen as peracid of enzymatic peracid origin for providing enhanced stain removing ability and improved detergency.

7. The process of claim 5 wherein the enzyme and substrate are selected in combination and employed in selected amounts to yield from about 1.0 to about 20 ppm available oxygen as peracid of enzymatic peracid origin for providing enhanced stain removing ability and improved detergency.

8. The process of claim 5 wherein $R_1=C_6$-$C_{10}$, $R_2=C_6$-$C_{10}$ or H and $R_3=C_6$-$C_{10}$ or H.

9. A process comprising the step of combining in an aqueous medium an activated oxidant system for in situ generation for peracid by enzymatic perhydrolysis, the activated oxidant system comprising:

(a) a source of peroxygen;

(b) an enzyme having lipase and/or esterase activity; and (c) a functionalized ester substrate having the structure

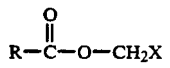

wherein R has at least one carbon atom and is a straight chain or branched chain alkyl optionally substituted with one or more functional groups and X comprises a functional group, the functionalized ester substrate being selected from the group consisting of:

(i) glycerides having the structure

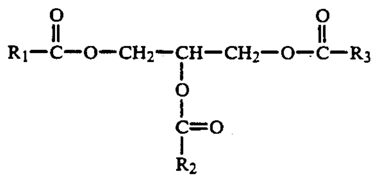

wherein $R_1=C_1$-$C_{12}$, $R_2=C_1$-$C_{12}$ or H and $R_3=C_1$-$C_{12}$ or H;

(ii) ethylene glycol derivatives having the structure

wherein n=1-10 and $R_1$ is defined as above; and (iii) propylene glycol derivatives having the structure

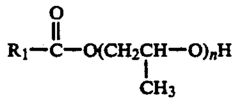

wherein $R_1$ and n are defined as above, the enzyme and ester substrate being selected in combination and employed in selected amounts for interacting with each other in the presence of hydrogen peroxide from the peroxygen source to produce a peracid having the formula RCOOOH wherein $R_1$ of (i), (ii) and (iii) is a substituent having from one to twelve carbon atoms with the newly created peracid compound producing available oxygen of at least about 0.1 ppm in an aqueous solution for providing enhanced stain removing ability, the functionalized ester substrate being incapable of substantial chemical perhydrolysis.

10. The process of claim 9 wherein the enzyme and substrate are selected in combination and employed in selected amounts of yield from about 0.5 to about 50 ppm available oxygen as peracid of enzymatic peracid origin for providing enhanced stain removing ability and improved detergency.

11. The process of claim 9 wherein the enzyme and substrate are selected in combination and employed in selected amounts to yield from about 1.0 to about 20 ppm available oxygen as peracid of enzymatic peracid origin for providing enhanced stain removing ability and improved detergency.

12. The process of claim 9 wherein $R_1=C_6$-$C_{10}$, $R_2=C_6$-$C_{10}$ or H and $R_3=C_6$-$C_{10}$ or H.

* * * * *